3,177,241
REACTIONS OF 2,3-DINITRONAPHTHALENE WITH CARBANIONS AND PRODUCTS RESULTING THEREFROM
Donald C. Morrison, Berkeley, Calif., assignor to Fundamental Research Company, Berkeley, Calif., a partnership
No Drawing. Filed Oct. 5, 1961, Ser. No. 143,033
2 Claims. (Cl. 260—465)

This invention relates to naphthalene chemistry. It is concerned particularly with certain novel reactions of 2,3-dinitronaphthalene and with the new and useful products produced thereby.

In my co-pending patent application Serial No. 107,649, filed May 4, 1961, now abandoned, I have disclosed a novel nucleophilic combined substitution and displacement reaction involving 2,3-dinitronaphthalene, directed especially to producing 1,3-disubstituted naphthalene derivatives which are very difficult to prepare by other methods, and which have value in the preparation of azo dyes and anti-oxidants. In the novel reaction disclosed in that application, one of the two nitro groups is replaced by a hydrogen atom, while the alpha hydrogen situated ortho to the leaving nitro group is replaced by an oxygen or amino nitrogen function in which the substituent group is joined to the alpha carbon of the ring by an oxygen to carbon, or nitrogen to carbon linkage.

I have now found it possible to substitute the alpha hydrogen situated ortho to the leaving nitro group by a carbon function, considered in modern chemical theory to be a carbanion (see Fuson's "Advanced Organic Chemistry," pages 2, 14, Wiley, New York, 1950, and Fieser and Fieser's "Organic Chemistry," 3rd Edition, page 554, Reinhold, New York, 1956) that is, a negatively charged radical whose central atom is carbon, providing a carbon to carbon linkage with the alpha carbon of the ring. The reaction making possible this carbanion substitution is also nucleophilic in nature, in that it is carried out under alkaline conditions and involves an oxidative electron shift.

Utilizing this reaction, I have found it possible to prepare many new and useful compounds, some of which are valuable in themselves while others may be utilized as intermediates in the preparation of commercially important end products. Thus, for example, I have found that in the presence of sodium methoxide in methanol, 2,3-dinitronaphthalene reacts readily with ethyl acetoacetate or with diethyl malonate to form the methyl ester of 3-nitro-1-naphthyl-acetic acid in good yield. The methyl ester is formed by transesterification induced by the alkaline reaction environment. Likewise, in a similar environment, 2,3-dinitronaphthalene reacts with primary nitro alkyls to form 3-nitro-1-naphthyl nitro alkanes in which the side chain nitro group is attached to the carbon atom attached to the 1 position on the ring.

The new compounds formed by the process of the invention, as exemplified by the examples hereinafter given, are themselves either active plant growth regulators or weedicides, or may be made so by replacing the nitro groups with amino, hydroxy, alkoxy, or alkyl amino groups. They also are intermediates in the preparation of other agricultural chemicals, such as insecticides and fungicides.

It is therefore a principal object of the invention to provide a process for preparing new 1,3-derivatives from 2,3-dinitronaphthalene.

Another object of the invention is a process for preparing 1,3-di-substituted naphthalenes from 2,3-dinitronapthalene in which a carbonion-derived substituent is attached to the ring carbon in the 1-position.

A further object of the invention is a 1,3-di-substituted napthalene in which the 1-position is occupied by a carbanion-derived substituent and the 3-position by a nitro group.

The manner of attainment of these and other objects of the invention will become evident on the further reading of this specification and the claims.

I am not certain as to the exact mechanism of the carbanion reaction with 2,3-dinitronaphthalene under alkaline conditions. The hypothetical reaction suggested by the equation below may be helpful, however, in giving a clearer understanding of the process and products of the invention:

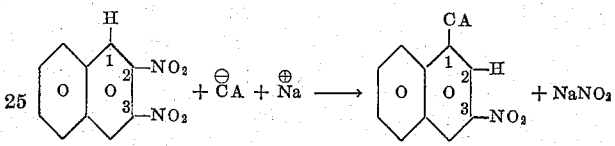

In this equation $$\overset{\ominus}{CA}$$

represents a typical carbanion, and $$\overset{\oplus}{Na}$$

may be sodium, potassium or any other analogous cation supplied by the alkaline environment. On the right hand side of the equation CA represents the carbanion-derived substituent which may be either the entire carbanion radical or that radical less any portion of it which may have been lost by alkaline cleavage. The product of the reaction is a substituted naphthalene in which the substituents consist of a nitro group in the 3-position and a group in the 1-position which may be an acetic acid ester, malonic acid ester, nitro, alkane, cyclopentadiene, indene, or cyanoacetic acid ester residue. The reaction is common to acidic compounds of the group consisting of lower alkylmalonic esters, nitro lower alkanes, cyclopentadiene, indene, and lower alkyl cyanoacetic esters. By acidic is meant specifically that the reactant compound from this group must have at least one hydrogen atom on a carbon atom next to the unsaturated substitutent. Thus dimethylmalonate is acidic while 2,2-dimethyl-dimethylmalonate and 2,2-dichloro-dimethylmalonate are not. Similarly, 2-nitropropane is acidic while 2-methyl-2-nitropropane (nitro-isobutane) is not, and indene is acidic while 1,1-dimethylindene is not.

A more detailed understanding of the invention may be obtained from a consideration of the following examples which are given for purposes of illustration and obviously not of limitation. The structure of all the products prepared according to the procedures outlined in these examples were established unambiguously, except for the products of Examples VIII and IX which were determined by infra-red spectroscopic analysis.

EXAMPLE I

*Preparation of 3-nitro-naphthalene 1-acetic acid methyl ester and 3-nitro-naphthalene 1-acetic acid*

Five (5) parts by weight of metallic sodium were dissolved in 350 parts by weight of methanol and the solution cooled to about room temperature. To this was first added 35 parts of ethyl acetoacetate and then 32 parts of 2,3-dinitronaphthalene. The mixture was refluxed at 64° C. for 45 minutes, then cooled and diluted with 5 volumes of water. After 2 hours the solid product was filtered, washed with water and dried. The yield was 31.5 parts by weight of 3-nitronaphthalene-1-acetic acid methyl ester, corresponding to a yield of 85.8 percent of the theoretical, based on the weight of 2,3-dinitronaphthalene employed.

While I am not certain as to the exact mechanism of the reaction involved in the preparation just described, the equations hereinafter set forth suggest what seems a reasonable explanation. It will be noted that the overall reaction is presumed to take place in three steps (1) carbanion reaction, (2) alkaline cleavage, and (3) transesterification:

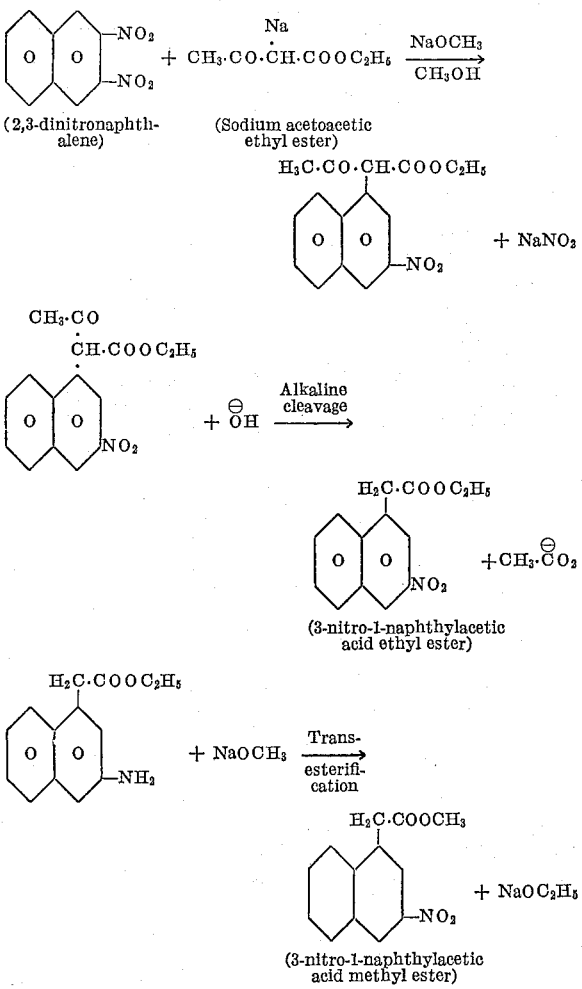

The 3-nitro-naphthalene-1-1-acetic acid methyl ester was hydrolyzed to the free acid in the following manner: Eighteen (18) parts by weight of the ester were added to a solution of 24 parts of sodium hydroxide in 800 parts of water. The solution was heated to the boiling point during 15 minutes with stirring and the boiling then continued for 10 minutes more. The resulting solution was cooled to 50° C., then acidified with hydrochloric acid, whereupon the insoluble 3-nitro-naphthalene-1-acetic acid was precipitated. After standing for 6 hours the acid was filtered off, washed with water, and dried. The yield was 15.4 parts by weight or 90.7 percent of the theoretical based on the weight of the methyl ester employed.

The structure for 3-nitro-1-naphthalene acetic acid was established by reacting it with amyl nitrite and subsequently heating to split off water and carbon dioxide from the side chain, leaving 3-nitro-1-naphthonitrile, which compound was found to be identical with an authentic sample made by means described in the chemical literature.

EXAMPLE II

*Preparation of 3-nitro-naphthalene-1-acetic ethyl ester and 3-nitro-naphthalene-1-acetic acid*

Two (2) parts by weight of metallic sodium were dissolved in 150 parts of ethyl alcohol and the solution cooled to about room temperature. To this solution were added 17.5 parts of ethyl acetoacetate and then 17 parts of 2,3-niditronaphthalene. This mixture was refluxed at 78° C. for 3 hours, then cooled, diluted slowly with 5 volumes of water and stirred for 15 minutes. After standing for 2 hours, the solid product was filtered off, washed with water and dried. The yield was 18.3 parts of the ethyl ester of 3-nitronaphthalene-1-acetic acid, corresponding to 93 percent of the theoretical based on the weight of 2,3-dinitronaphthalene employed. A portion of the ethyl ester thus prepared was hydrolyzed to 3-nitro-naphthalene-1-acetic acid in the same manner as described for the methyl ester in Example I.

EXAMPLE III

*Alternative preparation of 3-nitronaphthalene-1-acetic acid ethyl ester*

A solution of 9.0 parts of metallic sodium in 300 parts of ethanol was mixed with 75 parts of diethyl malonate. To this mixture were added 22 parts of 2,3-dinitronaphthalene. The mixture was refluxed for 30 hours at 78° C. It was then cooled and diluted with 4 volumes of water. After several hours the solid product was filtered off, washed with water and dried. The yield was 24 parts of 3-nitronaphthalene-1-acetic acid ethyl ester, corresponding to 92.5 percent of the theoretical. The product was identical with that prepared in Example II, in spite of the difference in reactants employed, as a result of the alkaline cleavage involved.

EXAMPLE IV

*Alternative preparation of 3-nitro-naphthalene-1-acetic acid methyl ester*

Five (5) parts by weight of the sodium salt of the diethyl ester of oxalacetic acid dissolved in 40 parts of methanol were mixed with 3 parts of 2,3-dinitronaphthalene and the mixture refluxed for 5 hours at 64° C. The mixture was allowed to cool overnight and then diluted slowly with 4 volumes of water. The precipitate of crude ester was filtered off, washed with water, and dried. A good yield was obtained of the same product as prepared in Example I. Here again alkaline cleavage was responsible for the identity of the products in spite of the difference in reactants.

EXAMPLE V

*Preparation of 3-nitro-naphthyl-nitromethane*

A solution of 1.84 parts by weight of metallic sodium in 135 parts of methanol was mixed with 16 parts of nitromethane, and 8.8 parts of 2,3-dinitronaphthalene were then added. This mixture was heated slowly to the boiling point to avoid too vigorous reaction and then refluxed for 10 minutes more at 64° C. It was then cooled to about room temperature and next treated with 10 volumes of water. A solution of 4 parts of potassium hydroxide in 15 parts of water was then added, and the mixture was stirred thoroughly. After several hours, the liquid was filtered and the filtrate acidified with hydrochloric acid, whereupon a tacky, plastic precipitate of 3-nitronaphthyl-nitromethane resulted. This consisted of a mixture of two forms, the aci (or enol) and normal (or nitro) forms by analogy with other aryl-nitromethanes. On standing overnight, the precipitate become hard and friable and could then be filtered off. The yield was 6.9 parts by weight of 3-nitro-naphthyl-nitromethane, mostly in the aci form (R.CH:NO.OH), and corresponded to 74 percent of the theoretical.

EXAMPLE VI

*Preparation of 3-nitro-1-naphthyl-nitroethane*

A solution of 1.6 parts by weight of metallic potassium dissolved in 75 parts of methanol was mixed with 8.5 parts of nitroethane, and 4.4 parts of 2,3-dinitronaphthalene were then added. The mixture was refluxed at 64° C. for 30 minutes and then cooled to about room temperature. It was then diluted with 1,000 parts of water, after which 3 parts of potassium hydroxide were stirred in. After about 4 hours the liquid was filtered and the filtrate acidified with hydrochloric acid. There resulted a precipitate of 3-nitro-1-naphthyl-nitroethane. This substance was less plastic than the corresponding nitromethane derivative of Example V and was more easily filtered off. The yield of solid after washing and drying was 3.9 parts by weight, equivalent to 79 percent of the theoretical.

EXAMPLE VII

*Preparation of 3-nitro-1-naphthyl-nitropropane*

This preparation was carried out exactly in the manner of Example VI except that the 8.5 parts by weight of nitro-ethane used in that example were replaced by the same weight of 1-nitropropane. The product was worked up in the same manner as in Example VI, and the yield of product was of the same order.

EXAMPLE VIII

*Carbanion reaction product of 2,3-dinitronaphthalene and cyclopentadiene*

A solution of 1.1 parts by weight of sodium methoxide in 32 parts of methanol was mixed with 3.5 parts of freshly distilled cyclopentadiene. Next 2.2 parts of 2,3-dinitronaphthalene were added and the mixture refluxed at 64° C. for 15 minutes and then left at room temperature for one hour. The mixture was then diluted with an equal volume of water, producing a precipitate of the desired product which, after standing for 12 hours, was filtered off, washed thoroughly with water, and dried. The brown compound thus prepared had an infra-red spectrum compatible with 3-nitro-1-naphthyl cyclopentadiene. On standing, the compound appeared to polymerize to a substance insoluble in hot toluene.

EXAMPLE IX

*Carbanion reaction product of 2,3-dinitronaphthalene and indene*

This preparation was carried out following generally the procedure employed in Example VIII, except that the cyclopentadiene used in that example was replaced with the same weight of indene. The reaction mixture in this example (with indene) was refluxed for 45 minutes at 64° C., then cooled to about room temperature and diluted slowly with 2 volumes of water. The crude, impure precipitate was extracted three times with hot hexane, and the residual insoluble product filtered off and dried. The tan compound thus prepared had an infra-red spectrum compatible with 3-nitro-1-naphthyl indene-1. On standing, the compound appeared to polymerize to a mixture partly soluble in hot toluene.

EXAMPLE X

*Preparation of 3-nitro-1-naphthyl-cyanacetic methyl ester*

In this example the carbanion was derived from a nitrile. To a solution of 1.1 parts by weight of sodium methodixe in 32 parts of methanol was first added 3 parts of ethyl cyanacetate and then 2.2 parts of 2,3-dinitronaphthalene. This mixture was refluxed at 64° C. for 66 hours, then cooled and diluted with 100 parts of water, whereupon a precipitate of 3-nitro-1-naphthylcyanacetic methyl ester resulted. This precipitate was separated and recovered.

The product thus prepared can serve as a starting material for the preparation of numerous other organic chemical compounds, as, for example, the preparation of 3-nitro-1-naphthylacetic acid by hydrolysis and decarboxylation.

The alkaline environment necessary for carrying out the processes of my invention may be provided by non-aqueous solutions of the alkali metal hydroxides—e.g., potassium hydroxide or sodium hydroxide—as well as by the alkali metal alkoxides utilized in the preceding examples. The following example illustrates such use.

EXAMPLE XI

*Alternative preparation of 3-nitro-naphthlene 1-acetic acid methyl ester*

A solution of 1.1 parts by weight of potassium hydroxide dissolved in 30 parts of methanol was first mixed with 5 parts of acetoacetic methyl ester and then with 2.2 parts of 2,3-dinitronaphthalene. This mixture was left at room temperature for 24 hours with occasional shaking. At the end of this time part of the reaction product had already precipitated, and the remainder was brought down by adding several volumes of water to the mixture. The precipitate was then filtered off, washed and dried. The yield was 2.15 parts by weight, equivalent to 87.8 percent of the theoretical, of 3-nitro-naphthalene 1-acetic acid methyl ester.

Consideration of the foregoing discussion and of the examples will emphasize the simplicity as well as the utility of the process of my invention. Reaction temperatures are low, ranging in general from about room temperature (20° C.) to about 100° C. The time required for completion of the reaction is subject to considerably wider variation but may be in some cases as short as about 15 minutes.

It will be noted that in all the foregoing examples the naphthalene derivatives prepared in accordance with this invention contain a nitro group in the 3-position and a substituted saturated carbon in the 1-position, and that the carbanion-generating compound employed in the reaction possesses a carbon atom having attached to it at least one hydrogen atom and at least one group possessing sufficient electron-attracting power to render the hydrogen atom acidic to the medium.

The diverse character of the many carbanion-generating compounds which may be employed in carrying out the processes of my invention, and the flexibility in several of the processing steps involved, will naturally suggest to one skilled in the art many variations and modifications both of process and of resulting products. All such variations and modifications are contemplated as coming within the scope of the invention as defined in the appended claims. It is pointed out that there is nothing critical as to this invention about the nature of the ester which is finally produced in carbanion reactions which cleave to give acetic moieties attached to the naphthalene ring in the "1" position. The specific ester prepared is the result of a transesterification side reaction, and is a function of the alcohol used as a solvent in the reaction.

I claim:

1. A process for preparing a substituted naphthalene in which the substituents consist of a nitro group in the 3-position and a group in the 1-position taken from the class consisting of —$CH_2COOR$, —$CH(CN)COOR$, —$CHR'NO_2$, cyclopentadienyl, and indenyl, where R is lower alkyl and R' is taken from the group lower alkyl and hydrogen, comprising reacting 2,3-dinitronaphthalene in a substantially anhydrous lower alkanol medium in the presence of strong base selected from the group consisting of lower alkanol alkali metal alkoxides and alkali metal hydroxides with an acidic compound of the group consisting of lower alkyl malonic acid esters, lower alkyl cyanoacetic acid esters, nitro lower alkanes, cyclopentadiene and indene.

2. A process according to claim 1 in which the reaction is carried out in the temperature range of about 20° C. to 100° C., and for a period of at least 15 minutes.

References Cited by the Examiner

Elsevier's Encyclopedia of Organic Chemistry, vol. 12B (New York, 1953), pp. 4154–4156.
Mayer et al.: Ber. Deut. Chem. 49, 2137–2141 (1916).
Ogata et al.: J. Org. Chem. 16, 1588–1592 (1951).

LEON ZITVER, *Primary Examiner.*

DUVAL T. McCUTCHEN, DANIEL D. HORWITZ, *Examiners.*